United States Patent [19] [11] Patent Number: 4,500,329
Campoli et al. [45] Date of Patent: Feb. 19, 1985

[54] SELF-ACTUATING VACUUM GAS/LIQUID SEPARATOR

[75] Inventors: Alan A. Campoli, Irwin; Fred Garcia, Donora, both of Pa.

[73] Assignee: United States of America as represented by Secretary of the Interior, Washington, D.C.

[21] Appl. No.: 488,482

[22] Filed: Apr. 25, 1983

[51] Int. Cl.³ .............................................. B01D 19/00
[52] U.S. Cl. ...................................... 55/189; 55/218; 210/533
[58] Field of Search ........................... 55/55, 189, 218; 210/513, 532.1, 533, 534

[56] References Cited

U.S. PATENT DOCUMENTS

| | | | |
|---|---|---|---|
| 1,198,759 | 9/1916 | Boatman | 210/534 |
| 2,804,172 | 8/1957 | Sender | 55/55 |
| 3,345,803 | 10/1967 | Smith | 55/55 |
| 3,523,406 | 8/1970 | Chenoweth et al. | 55/55 |
| 3,837,494 | 9/1974 | Stevenson | 210/533 X |
| 4,216,081 | 8/1980 | Trawinski | 210/533 X |

Primary Examiner—Charles Hart
Attorney, Agent, or Firm—Thomas Zack; Donald A. Gardiner

[57] ABSTRACT

A self-actuating gas/liquid separator which depends on the counterbalancing of the liquid in a closed container in excess of a certain height and the vacuum gas pressure for its actuation and operation. Primarily this invention was directed to the separation of water and methane gas after they are discharged from an inclined coal mine drainage bore hole. Basically, there are two inclined coaxial conduits, one inside the other, with the inner smaller conduit providing the path for the movement of the gas and the outer larger conduit the path for the liquid. Attached to the larger conduit, near its end remote from the source of gas and liquid to be separated, is a third conduit with a U-shaped section and a one-way liquid passing check valve. Liquids drain into the first and third conduits and the second conduit is operably subjected to a vacuum generating source. Eventually, as the liquids fill their conduit containers, there will come a time when the counterbalancing gas pressure created by the vacuum and the rising liquid level become unbalanced. This situation occurs at a given height of the liquid in its conduit containers. Once exceeded, the check valve is forced open to discharge excess liquid and stays open as long as the liquid exceeds the counterbalancing height.

2 Claims, 6 Drawing Figures

SELF-ACTUATING VACUUM GAS/LIQUID SEPARATOR

BACKGROUND OF THE INVENTION

Our invention is a gas/liquid separator which operates under the effect of a created partial vacuum.

DESCRIPTION OF THE PRIOR ART

In underground mining operations, it is sometimes required that methane gas within the roof strata be removed as mining of the material takes place. A good example is when, in a longwall mining operation, the fractured roof strata collapses into the void created and the methane contained in the roof strata migrates through it into the mine opening. Previously, this methane gas has been extracted by drilling cross measure bore holes into the roof strata and creating a partial vacuum to draw out and capture the gas. A problem arises in that some of these bore holes produce water which must be separated from the methane before it enters the underground methane pipeline used to transport the gas. The U.S. Bureau of Mines Report of Investigations (RI) 8644 entitled "Underground Gob Gas Drainage During Longwall Mining" details the described prior art drainage procedures.

The only known vacuum water separator used to separate gas-methane-from water under the effect of a partial vacuum in the mining industry is illustrated in "Report No. 2, Degasification of Longwalls," January 1978, prepared by the Central Mining Institute, Katowice, Poland. As more fully described with respect to FIG. 1 herein, this prior art separator utilizes a tank as a temporary water retaining storage device, a movable float in the tank, and a magnet shut off valve actuated by the float. The problems which this type of separator have are: it is expensive; it must be operated intermittently to allow the drainage of water from its retaining tank; the float and magnet must be calibrated to maintain their delicate balance, and its moving metal parts are exposed to corrosive mine water.

In contrast to the prior art devices, out invention provides for an inclined first conduit connectable to the drainage bore hole with an attached abbreviated U-shaped third conduit section. Within this first conduit, a smaller diameter gas conveying second conduit is fixed. At the end remote from the bore hole, a partial vacuum is established within the larger second conduit. The pressure of the liquid in the large conduit is subjected to, and its relative position therein, is counterbalanced by the gaseous pressure caused by the vacuum. To prevent excessive fluid accumulations within the first and third conduits, a one-way relief check valve in the third conduit is actuated to insure the necessary counterbalancing forces and to drain excessive fluids therefrom. Thus, the only moving part in our invention is the one-way check valve thereby insuring a simple, continuously operable, long wearing gas/liquid separator.

SUMMARY OF THE INVENTION

A gas/liquid separator connectable to a source such as an underground mine drainage bore hole. An inclined liquid retaining first conduit extends into the bore hole at one end. Connected to it is a bent section conduit with a one-way valve. This bent section conduit is located at or near the first conduit's other end outside of the bore hole. Extending in the same direction and mounted in the first conduit is a second gas carrying conduit. This second conduit extends near the mine bore hole at one opened end and is connected at its other end to an underground methane pipeline which is maintained under a partial vacuum by a surface pump. By counterbalancing the gas pressure of the vacuum against the height of the liquid in the retaining sections, excess liquids can be continuously discharged through the check valve.

Figure 1:
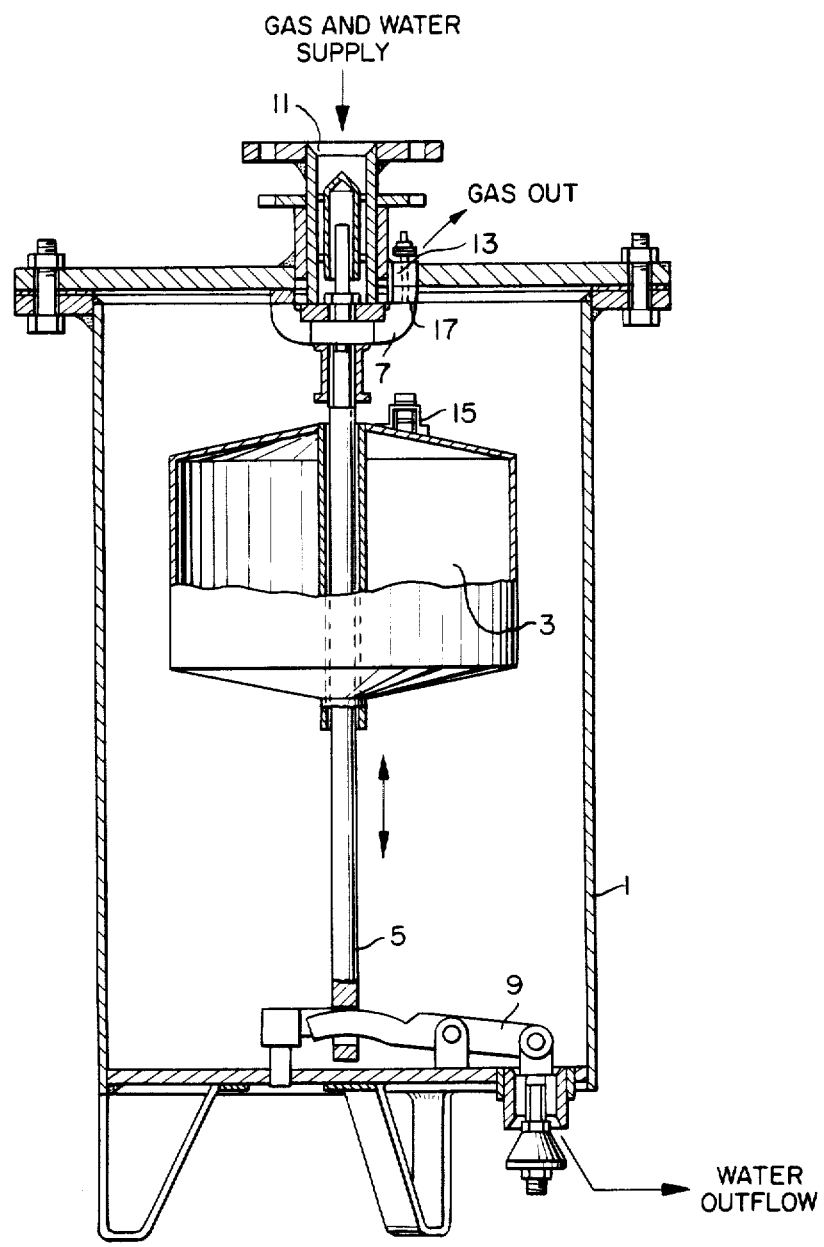
FIG. 1 is a cross-sectional view of the prior art gas/liquid separator mentioned heretofore.

The FIG. 1 prior art gas/liquid separator basically consists of a liquid retaining tank 1, a float 3 movable with a rod 5 thereon, a permanent magnet 7, and a liquid valve control assembly and valve 9. The entering gas and liquid are under a partial vacuum and enter the tank through an opening 11 in its top. As the liquid, usually water, accumulates in the tank, the lighter gas is drawn off through an opening 13 on the tank. When the liquid begins to fill the tank, the float 3 and its rod 5 move up thereby causing the water outflow valve assembly 9 to move towards a liquid discharge state. At a certain level, the float is attracted to the permanent magnet 7 which automatically cuts off the incoming gas/liquid flow when the float's plug 15 engages the stream's incoming orifice 17. After a sufficient amount of fluid is discharged from the tank, the float is lowered, the magnetic attraction broken, and the process begins again as the gas/liquid supply again reenters the tank.

Figure 2:
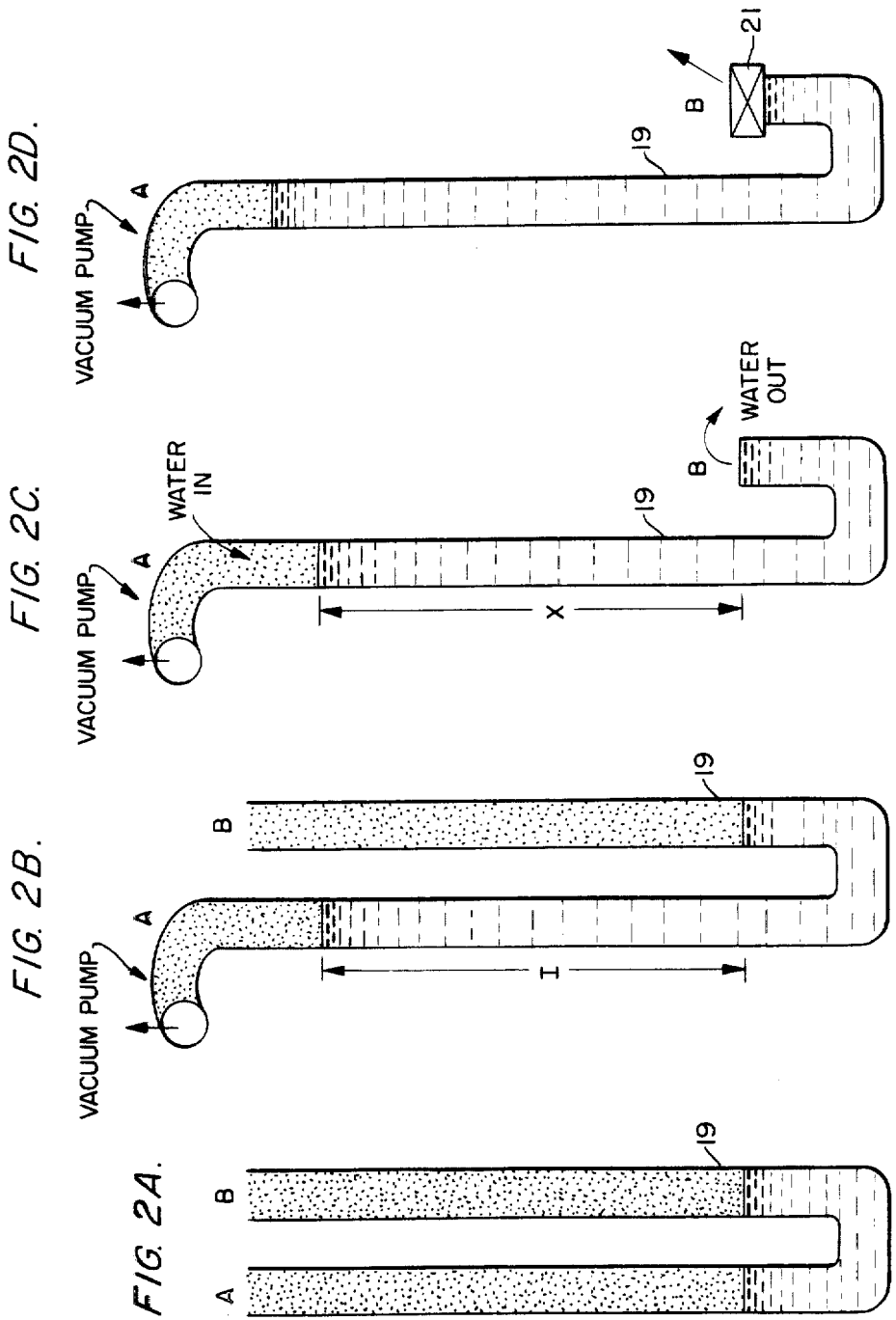
FIG. 2(a)-(d) schematically illustrates the principles of the operation of the U-shaped section conduit of the preferred embodiment.

The operation of our self-actuating gas/liquid separator can be better understood by reference to FIGS. 2(a)-(d). Essentially, these figures show the principles behind how the counterbalancing gas and liquid forces react within our invention. In FIG. 2(a), the bent or U-shaped tube 19 is shown with its legs A and B marked by their respective end points A and B. The dashed horizontal lines represents a liquid whereas the dotted leg sections of the tubes represent the gas. When the gaseous pressure in legs A and B are both equal to atmospheric pressure, the liquid in tube 19 is the same height in both legs as in FIG. 2(a). When the gaseous pressure in one of the legs or columns is connected to a vacuum pump, as leg A, then the liquid rises in this column due to the greater gaseous pressure from leg or column B. FIG. 2(b) illustrates this latter situation where the fluid is displaced a distance I up leg A from its normal equal pressure situation of FIG. 2(a). This displacement distance I can be use to indicate the amount of vacuum exerted in inches of water gage pressure. In FIG. 2(c), this water gage pressure is represented by X wherein liquid over and above the height necessary to form the column in shortened leg B is depicted as flowing out by the arrows. With a longer opened column B, gases would normally be pulled in from side "B" to side "A" in an attempt to achieve an equilibrium situation if insufficient fluid were present to form the water column. In some unbalanced situation there may be insufficient fluid present to form the water column. In some unbalanced situations where the expelled gas is explosive—like methane—an unacceptable ambient air/gas mixture might be formed. To prevent this air/gas mixture from occuring, a one-way check relief valve 21 can be used which allows a flow only out of leg B as in FIG. 2(d).

Figure 3:
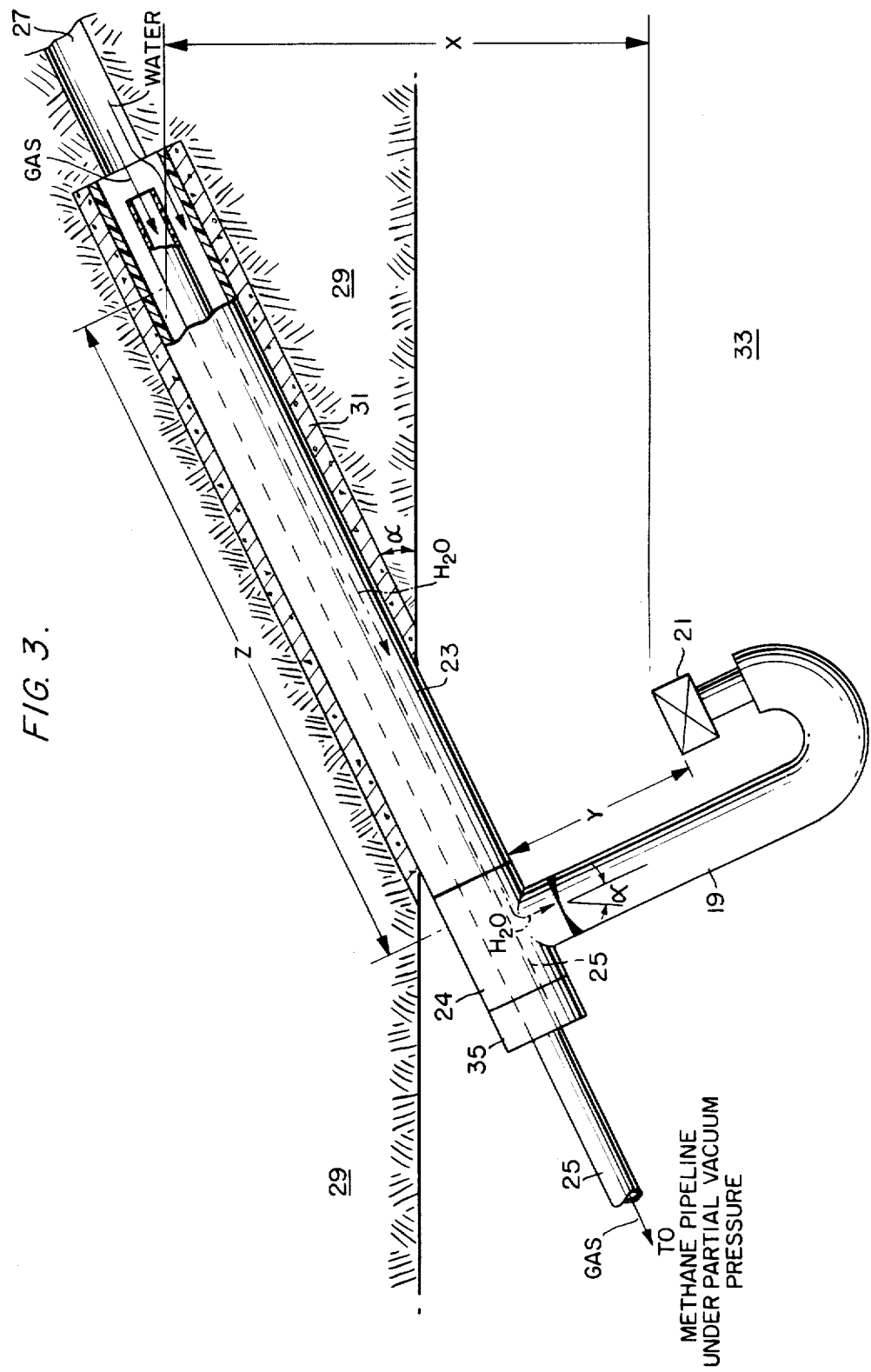
FIG. 3 depicts the preferred embodiment in situ connected to a drainage bore hole.

The principles of FIGS. 2(a)-(d) are incorporated in the FIG. 3 preferred embodiment of our invention wherein like letters and numbers represent the same elements. Basically, the embodiment consists of the FIG. 2(d) pipe 19 with its U-shaped end section and oneway check relief valve 21 which pipe is connected to a first straight section pipe 23; a tee pipe joint 24; and a smaller diameter, straight open end, gas carrying pipe 25 mounted coaxially within the larger diameter pipe 23. Polyvinyl chloride plastic materials have been used to construct both of these two pipes as well as the U-shaped vertically oriented section 19. The tee joint 24 connects pipes 19 and 23 together as well as the two sections of pipe 23 as shown. Grout material encircles and fixes the larger pipe 23 at an inclined angle (shown at about 25°) into the mine roof 29. The two straight pipes are fixed coaxially together with a fluid tight seal 35 at the outer end of pipe 23 whereat pipe 25 extends from it to a remote surface (not shown) vacuum generating source. At its other end remote from the mine working area 33, the straight pipe 23 engages the inclined methane drainage bore hole 27 at the same angle. This bore hole has been previously drilled into the mine roof and allows water and gas to drain into the pipe 23. Since, the end of smaller pipe 25 near the bore hole is opened and spaced from the end of pipe 23 in the bore hole, the water being drained does not initially enter its elevated opened end but flows under it into larger pipe 23 and the U-shaped section attached to outer pipe section 19. All conduit connections are fluid tight. Eventually the water column fills all of pipe 19 and pipe 25 which act as containers therefor until it reaches the height X equal to the gaseous vacuum pressure induced by the smaller pipe 25 as explained with respect to FIG. 2. Water over and above the volume necessary to form this counterbalancing column of height X flows out through the check valve 21. This occurs since the valve is forced opened by pressure due to the act of the excess water (above height X).

The height of water column X depends on the vacuum applied and adjusts itself accordingly. The maximum working vacuum is determined by the height of the water column that can be established without allowing water to enter conduit 25 at its opened end. The variables which can also effect the maximum working vacuum are: the length of the pipe 19; the angle of inclination ($\alpha$) of the bore hole and its aligned attached pipe 23, and the length of the inner gas pipe 25. By increasing any or all of these three variables, the distance X can be increased. Increasing or changing the length of inner pipe 25 is the most feasible of these alternatives.

Again referring to FIG. 3, the maximum partial vacuum that can be applied to the system depends upon the length (Z) of the mine gas pipe 25 measured from the middle of tee joint to where it intersects lines X as shown, and the angle $\alpha$. Theoretically, $\alpha$ can vary from 0 to 90 degrees, but in actual practice, this angle has ranged from about 20 to 40 degrees. The height of the water X and, therefore, the maximum partial vacuum that can be applied increases as the angle $\alpha$ increases. The height X may also be affected by the length of the pipe section 7. As the length of pipe section Z increases, so does X and, as a result, the maximum partial vacuum that can be applied. In actual practice, we have limited the length Z to about 20 feet. However, it could conceivably range from 20 to over 100 feet.

Research we have conducted shows that the methane gas flow increases as the partial vacuum applied increases. For a given pipe length Z and angle $\alpha$, there is a fixed maximum partial vacuum pressure that can be applied. If this value is exceeded, water will begin to flow through the center pipe 25 and into the main methane underground pipeline rather than being discharged through relief valve 21. For example, if the angle $\alpha$ is 30 degrees, the length Z 20 feet and the distance Y on the pipe 19 as shown, about 2 feet, then X would be 11.7 feet or 140.4 inches water gage. Values greater than this will cause the undesireable flow of water into pipe 25.

Normally the diameters of the coaxial pipes 23 and 25 can vary over almost any reasonable range, subject to the requirement that the annulus space between them must be large enough to permit te water to drain as rapidly as it is produced. Typically diameters of 3.5 and 2 inches, respectively, have been used for pipes 23 and 25 to achieve a maximum water production rate of about 15 gallons per minute.

It should be clear that our invention provides for the automatic drainage of liquids under varying vacuum levels of the associated gas. The only moving mechanical part is the check valve, thus, insuring a very reliable operation for the system. Water or any other liquid is removed from the mine bore hole without any interruptions in the methane or other gas production. Thus, the simplistic nature of this invention insures its reliable operation with little or no maintenance.

Other liquids and gases besides water and methane can be employed using the disclosed principles of our invention. In fact, although we have mentioned only methane gas and water as the ingredients being separated, the actual gases and liquids separated in a coal mine are more complex. Methane is the predominant gas but there are also minor concentrations of carbon dioxide, oxygen, nitrogen, propane, butane, hydrogen, and helium. The U.S. Bureau of Mines RI 7762 entitled "Composition of Coalbed Gas" describes more details on this point. As for the discharged liquid, it is normally water and can range from alkaline, to fresh, to extremely salty. The pipe section 19 need not be U-shaped and the valve can be selected to be actuated at predetermined pressures. None of these variations of materials or design should be used to change the scope and spirit of our invention which is to be limited only by the claims that follow.

We claim:

1. A self-actuating gas/liquid separator with only one moving valve part comprising:

a partial gaseous vacuum generating source;

an inclined first conduit capable of conveying a liquid therein by the force of gravity, said conduit being insertable at one end into a connection to the source of gas and liquid to be separated;

a second inclined smaller conduit capable of conveying a gas extending in the same direction as the first conduit and mounted in said first conduit, said second conduit being opened to receive gases at the end thereof nearer the source of supply for the gas and liquid to be separated, said second conduit being connected at its other end to said partial gaseous vacuum generating source to cause gases to flow from its opened end towards said vacuum generating source;

a bent third conduit in fluid communication with said first conduit and adapted to receive gravity drained separated liquids from the gas and liquid to be separated, said third conduit being vertically below the end of the first conduit which receives the gas and liquid to be separated; and said third conduit having a liquid flow control valve constituting the one moving part of the separator, said valve being attached to the third conduit to permit the flow of excess liquid therethrough once the liquid height in the first conduit exceeds that needed to counter-balance the created partial vacuum pressure on the gas.

2. The separator of claim 1 wherein:

said second conduit is bonded in a fluid-tight relationship to the first conduit and extends therefrom; and said third conduit has a U-shaped end portion and its control valve is a one-way valve thereat near its end remote from the first conduit.

* * * * *